(12) United States Patent
Haeberli

(10) Patent No.: US 6,493,603 B1
(45) Date of Patent: Dec. 10, 2002

(54) MODELING AND FABRICATION OF OBJECTS REPRESENTED AS DEVELOPABLE SURFACES

(75) Inventor: Paul Haeberli, San Francisco, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/449,666

(22) Filed: Nov. 30, 1999

(51) Int. Cl.$^7$ .............................................. G06F 19/00
(52) U.S. Cl. ....................... 700/182; 700/118
(58) Field of Search ..................... 700/182, 165, 700/145, 98, 97, 103, 206, 118

(56) References Cited

U.S. PATENT DOCUMENTS 5,864,482 A * 1/1999 Hazama et al. ............. 700/182
6,144,896 A * 11/2000 Kask et al. ................. 700/165

OTHER PUBLICATIONS

Burns, Marshall, *Automated Fabrication—Improving Productivity in Manufacturing*, PTR Prentice Hall, New Jersey, 1993, pp. 1–231.
Chesapeake Light Craft, "Assembling a CLC Kit," published on the internet at http://www.clcboats.com/assembling.html , Jan. 26, 2001.
Chesapeake Light Craft, "Building a Boat," published on the internet at http://www.clcboats.com/buildaboat.html, Jan. 26, 2001.

* cited by examiner

Primary Examiner—Leo Picard
Assistant Examiner—Kipest Bahta
(74) *Attorney, Agent, or Firm*—Sterne, Kessler, Goldstein & Fox P.L.L.C.

(57) ABSTRACT

The invention described herein is a method, system, and computer program product for the design and fabrication of the surfaces of an object. The process begins by using a CAD process to design surfaces of the object. In particular, the surfaces are modeled using developable surfaces only. The intersections of the developable surfaces are then calculated. Any excess surface area of the developable surfaces is then trimmed. The boundaries of each developable surface are abstracted to produce a two-dimensional planar model of each developable surface. From each planar model, a full-sized two-dimensional shape can then be fabricated in proportion to the planar model. Each fabricated shape can then be bent in accordance with the corresponding developable surface of the CAD model. Finally, the edges of the fabricated shapes are attached as determined by the calculated intersections of the developable surfaces of the CAD model.

15 Claims, 10 Drawing Sheets

MODELING AND FABRICATION OF OBJECTS REPRESENTED AS DEVELOPABLE SURFACES

BACKGROUND OF THE INVENTION

1. Field of the Invention

The invention described herein relates to computer-aided design (CAD) and to fabrication.

2. Related Art

Computer aided design (CAD) is now widely used in a variety of industries. For example, CAD technology is used by the electronics industry to design chips, by the automotive industry to design mechanical components, and by architects to render building designs. The popularity of CAD is due in part to its ability to facilitate rapid and economical design. Moreover, in many CAD applications, the resulting design can be easily saved and converted into a final product. The fabrication of circuit boards is an example of this.

In other fields, however, the conversion of a computer-aided design to a final product is less practical. In particular, the fabrication of large three-dimensional solids that have been designed with a CAD process can be difficult. Existing fabrication methods, such as stereo lithography and laser sintering, are capable of precisely constructing three-dimensional solids directly from a CAD process, but the capabilities of these fabrication methods are limited. Such fabrication processes generally build a solid using an iterative layering process. Such processes can operate, for example, by using heat to solidify successive layers of resin at points determined by the CAD process. This results in the desired three-dimensional solid. Such processes may alternatively build an object by successively layering particulate matter, such as metal shavings, and bonding the particles at locations determined by the CAD process. These processes are limited, however, in the size of the solid that can be built. While they can generally produce an arbitrary three-dimensional shape, they are not typically able to build an object larger than a two foot cube. Moreover, these methods are slow. Construction of a two foot cube can take 24 hours. These processes are also expensive, and the equipment tends to be difficult to maintain. In general, these processes are more useful for construction of models, i.e., prototyping, rather than for production of full-scale objects.

There is a need, therefore, for a method by which large three-dimensional objects can be designed using a CAD process, such that the resulting design lends itself to ready fabrication. Fabrication based on such a design must be relatively fast and inexpensive.

SUMMARY OF THE INVENTION

The invention described herein is a method, system, and computer program product for the design and fabrication of an object comprised of one or more surfaces. A process begins by using a CAD process to design surfaces of the object. In particular, the surfaces are modeled using developable surfaces only. The intersections of the developable surfaces are then calculated. Any excess surface area of the developable surfaces is trimmed. The boundaries of each developable surface are abstracted to produce a two-dimensional planar model of each developable surface. From each planar model, a full-sized two-dimensional shape can then be fabricated in proportion to the planar model. Each fabricated shape can then be bent in accordance with the corresponding developable surface of the CAD model. Finally, the edges of the fabricated shapes are attached as determined by the calculated intersections of the developable surfaces.

Features and Advantages

The invention has the feature of allowing the computer-aided design of arbitrarily large surfaces and shapes. The invention has the additional feature of using developable surfaces to model the surfaces of an object.

The invention has the advantage of modeling the surfaces of an object so that the ultimate fabrication of the surfaces can be done precisely. The invention has the further advantage of providing a means for ready attachment of the edges of fabricated shapes.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

Figure 1:
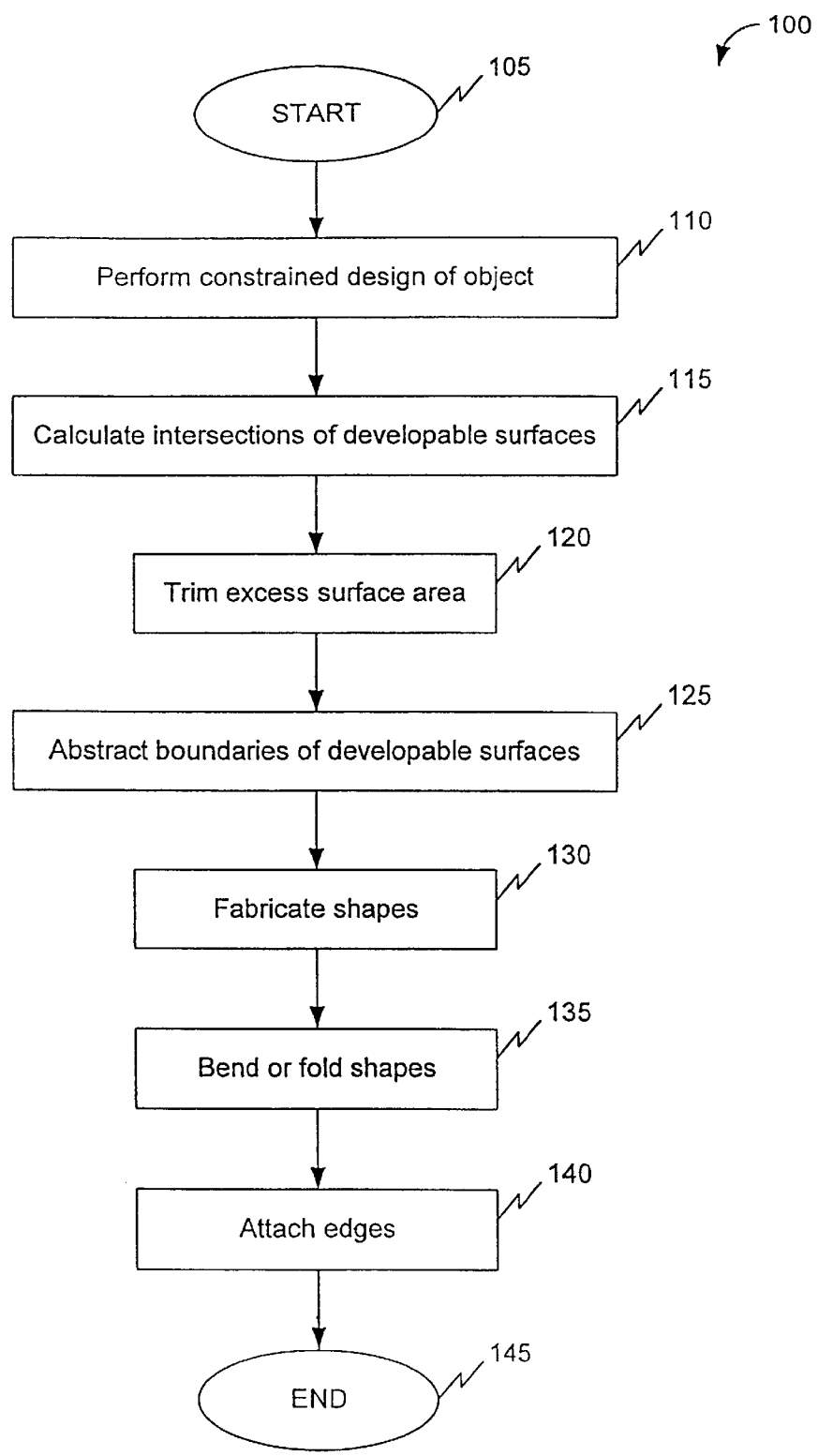
FIG. 1 is a flowchart illustrating the overall operation of an embodiment of the invention.

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Contents

I. Overview

II. Method

A. CAD process

B. Calculation of intersections

C. Boundary abstraction

D. Edge attachment
III. Environment
IV. Conclusion

I. Overview

The invention described herein represents a method of design and fabrication, wherein the output of an automated design process permits fast and economical fabrication. The method begins with a CAD process that is constrained to use developable surfaces to model the surfaces of an object under design. The intersections of the developable surfaces can then be calculated. The excess surface area is trimmed from the developable surfaces. The boundaries of the developable surfaces can then be calculated in three-dimensional space and abstracted to two-dimensional space. This results in a two-dimensional planar model corresponding to each developable surface. The planar models are used to fabricate full-sized two-dimensional shapes. The fabricated shapes can then be formed, i.e., bent or folded, in accordance with the three-dimensional model formulated using the CAD system. The edges of the fabricated shapes can then be attached to produce the object. In some cases where the fabricated shapes are made of a flexible material, attachment of the edges can be sufficient to form the fabricated shapes and create the correct three-dimensional shape.

Terminology

The following section defines terms that occur frequently throughout the application.

A developable surface is a three-dimensional surface which results from certain permissible deformation of a flat, two-dimensional surface. The permissible deformations are limited to bending and/or folding of the two dimensional surface. Moreover, the surface cannot be stretched in any way during deformation. An example of a developable surface is a sheet of paper. The paper can be deformed by bending or folding, but the paper cannot generally be stretched. A developable surface can alternatively be viewed as any surface that can be unfolded or flattened out into a flat surface.

Trimming refers to a CAD operation in which a portion of a surface is deleted. If, for example, a three-dimensional cube is being modeled on a CAD system, six flat surfaces can be used to create the six faces of the cube. Any of the surfaces, however, may extend beyond the square face of the cube. If so, the excess surface area can be deleted, or trimmed, from the three-dimensional model.

II. Method

The overall process of the invention is illustrated in flowchart 100 of FIG. 1. The process begins with a step 105. In a step 110, an object to be fabricated is designed using a CAD process. The CAD process is constrained, however, so that surfaces of the object are modeled using developable surfaces only. As will be seen below, this permits efficient fabrication of the ultimate design. In a step 115, the intersections of the developable surfaces are calculated. This determines the boundary of each developable surface for purposes of modeling the object. In a step 120, the excess surface area of each developable surface is trimmed away. In a step 125 the boundaries of each developable surface, modeled by the CAD process in three dimensions, are then abstracted to two dimensions. This effectively unfolds or flattens each developable surface. The result is referred to hereinafter as a planar model of the developable surface. Step 125 serves to define precisely the boundaries of each planar model.

In a step 130, each planar model is used in the fabrication of a full-sized planar shape to be used in the construction of the object. In a step 135 the fabricated shapes are bent, or formed, according to their corresponding developable surfaces, as modeled in the CAD process. In a step 140, the edges of the formed shapes are attached. Again, this is done in accordance with the three dimensional model developed in the CAD system. As will be described below a number of methods exist for the attachment of the edges. In some cases, if the fabricated shapes are made of material that is flexible, attachment of the edges is sufficient to form the fabricated shapes and create the correct three-dimensional shape. In such a situation, steps 135 and 140 are performed simultaneously. The process ends with a step 145.

A. CAD Process

Figure 2:
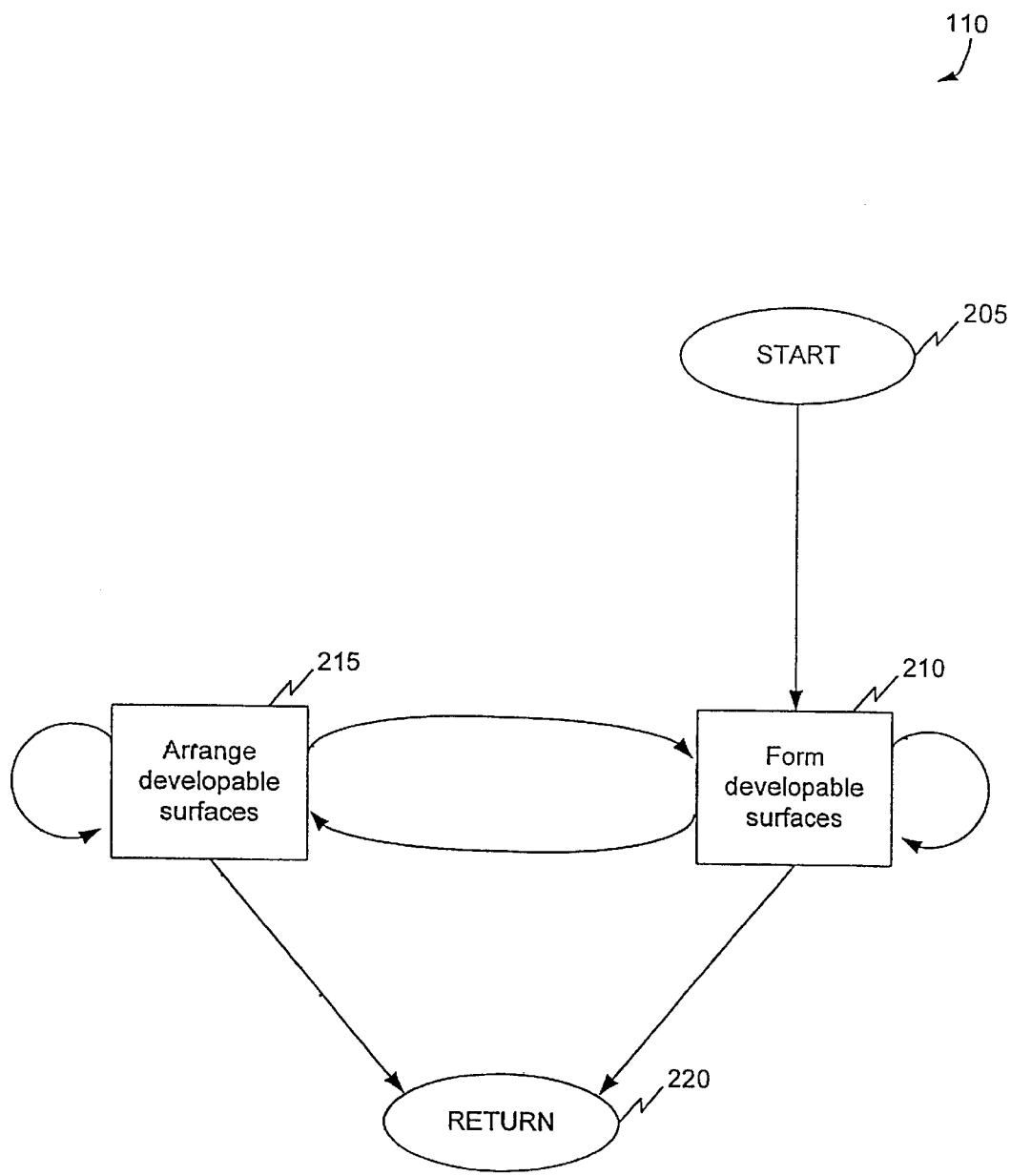
FIG. 2 is a flowchart illustrating the CAD process where the design is constrained so as to use developable surfaces.

The constrained CAD process of step 110 is illustrated in greater detail in FIG. 2. The process begins with a step 205. In a step 210, developable surfaces are created and formed (i.e., bent or folded) as desired by a designer. In a step 215, the developable surfaces are arranged relative to one another. Note that steps 210 and 215 may be repeated or alternated. This permits the designer to creatively form and arrange developable surfaces as desired. The process concludes with a step 220.

B. Calculation of Intersections

Figure 3:
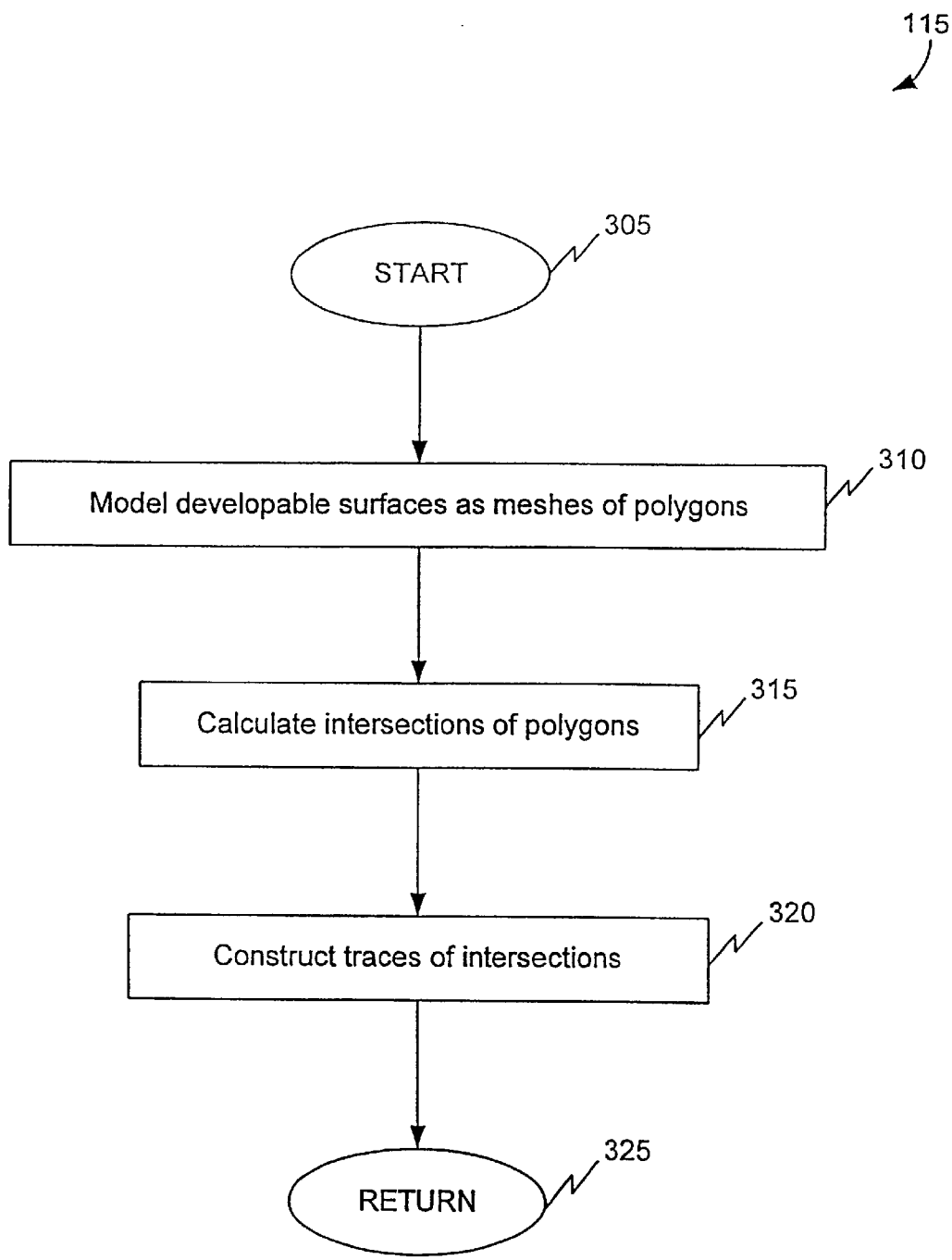
FIG. 3 is a flowchart illustrating the calculation of the intersections of the developable surfaces, according to an embodiment of the invention.

Step 115, the calculation of intersections of the developable surfaces, is illustrated in greater detail in FIG. 3. The process begins with a step 305. In a step 310, the developable surfaces are modeled as meshes of polygons. This procedure is well known in the fields of computer graphics and CAD. In an alternative embodiment of the invention, step 310 may be performed as a part of step 215, the arrangement of developable surfaces. In a step 315, for each developable surface, the other developable surfaces that intersect it are determined. The intersections are calculated for all polygons that intersect polygons of other developable surfaces. In a step 320, the intersections of the polygons of step 315 are connected to construct traces of the intersections of the developable surfaces. In this way the surface intersections are defined as curves in three-dimensional space. The process concludes with a step 325.

Note that in some designs, a developable surface may not intersect any other developable surfaces. In this case, step 315 results in no intersecting developable surfaces being identified. Consequently, no points of intersection result. In step 320, therefore, no traces are produced. In other designs, a developable surface may intersect itself. An example of this is the formation of a developable surface into a tubular structure. In this case, step 315 results in a determination that the developable surface intersects itself. Accordingly, points of intersection are identified. In step 320, a trace of the intersection is constructed.

C. Boundary Abstraction

Figure 4:
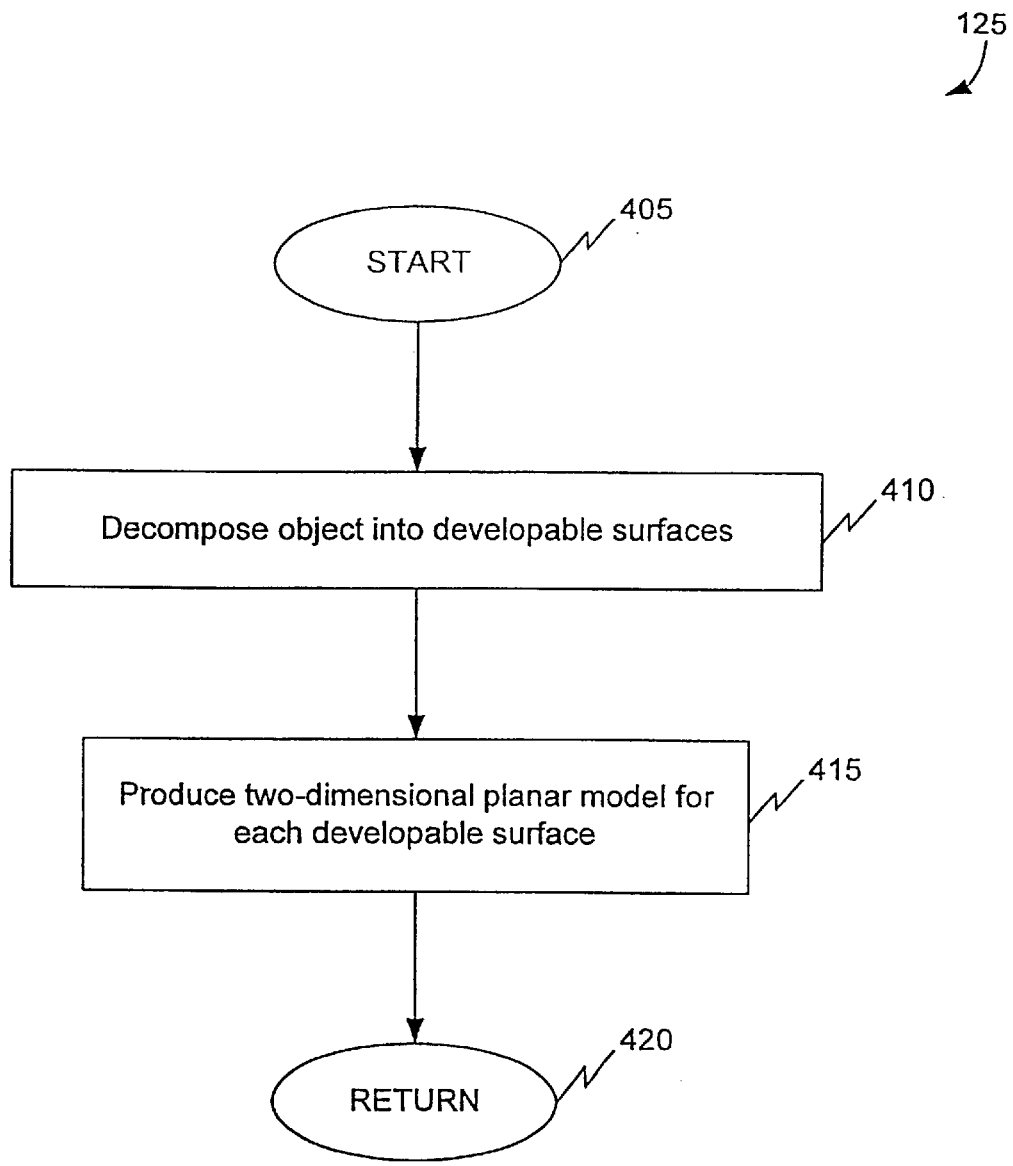
FIG. 4 is a flowchart illustrating the abstraction of the boundaries of the developable surfaces, according to an embodiment of the invention.

Step 125, the abstraction of the boundaries of the developable surfaces, is illustrated in greater detail in FIG. 4. The process begins with a step 405. In a step 410, the object that has been modeled on the CAD system is decomposed into a its component developable surfaces. In a step 415, a two-dimensional planar model for each developable surface is produced. This represents a flattening out of each developable surface that was formed in the constrained design process of step 110. Step 415 serves to define the boundaries of each planar model. The process ends with a step 420.

Figure 5A:
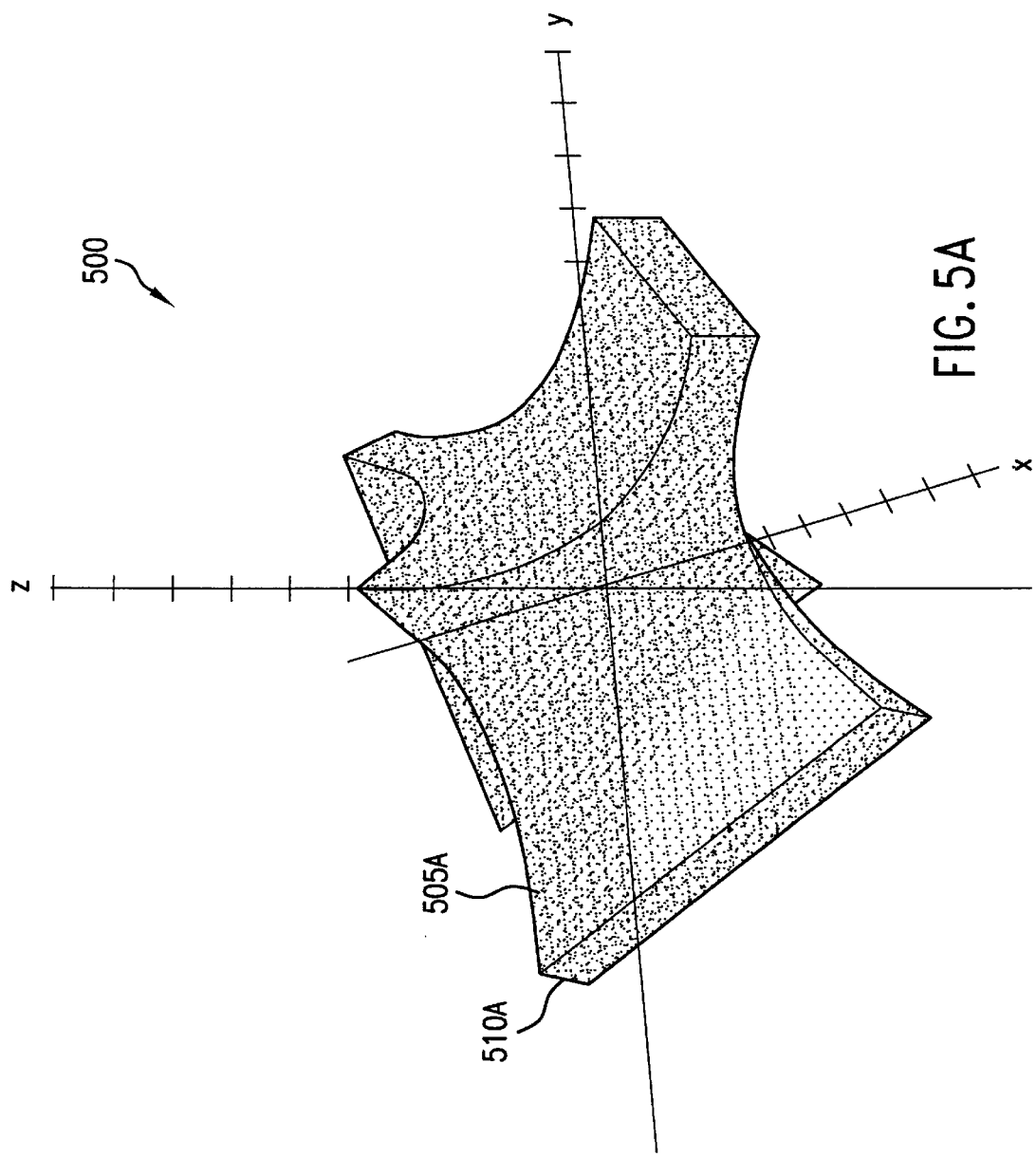
FIG. 5A illustrates an example of an object designed with a CAD process, where the edge-connected surfaces of the object are modeled using developable surfaces.
Figure 5B:
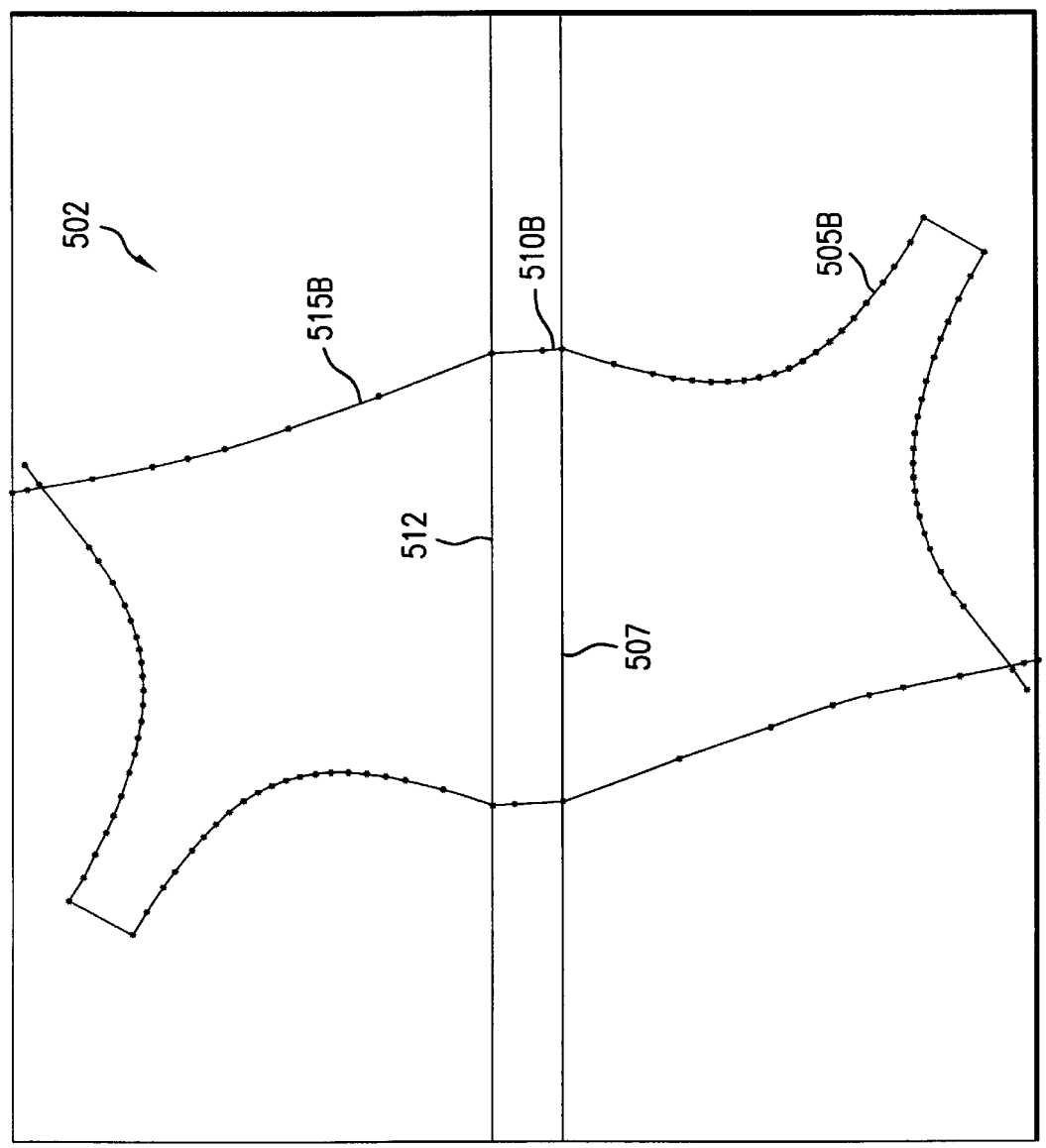
FIG. 5B illustrates a two-dimensional planar model corresponding to a developable surface of the object shown in FIG. 5A.

Step 125 is further illustrated in FIG. 5A and 5B. In FIG. 5A, a three dimensional object 500 is shown, as modeled by a CAD process. Surfaces of the model in this example are modeled as developable surfaces. After object 500 is decomposed into its component developable surfaces according to step 410, each resulting developable surface is converted into a planar model according to step 415. A single developable surface is used to model faces 505A, 510A, and 515A, where face 515A is not visible to the viewer. The developable surface is converted into a single planar model 502, illustrated in FIG. 5B. Planar model 502 has folds 507 and 512, which separate planar model 502 into portions 505B, 510B, and 515B. Planar model 502 can then be scaled up and used to fabricate a full-size shape for eventual construction of object 500.

Note that in an embodiment of the invention, the planar models are modified by additional geometry placed at the boundaries. Examples of this additional geometry include model attachment tabs described below. When the planar models are scaled up to a full-size fabricated shape, the additional geometry takes the form of physical attachment tabs, also described below. Physical attachment tabs facilitate the attachment of the edges of the fabricated shapes to other components of the object, such as other fabricated shapes, during construction of the object.

D. Edge Attachment

Figure 6A:
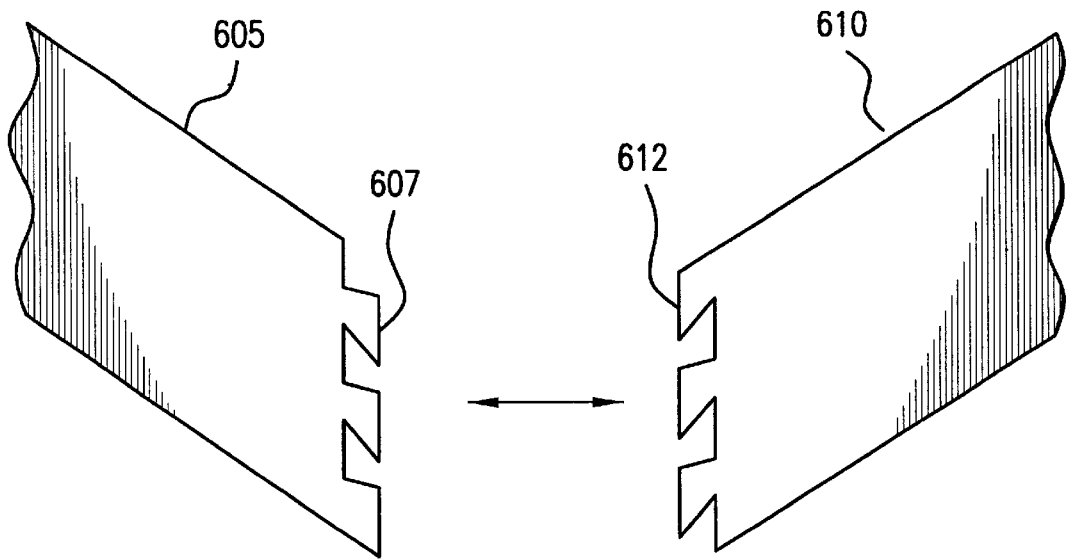
FIG. 6A illustrates a method of edge attachment, according to an embodiment of the invention.
Figure 6A:
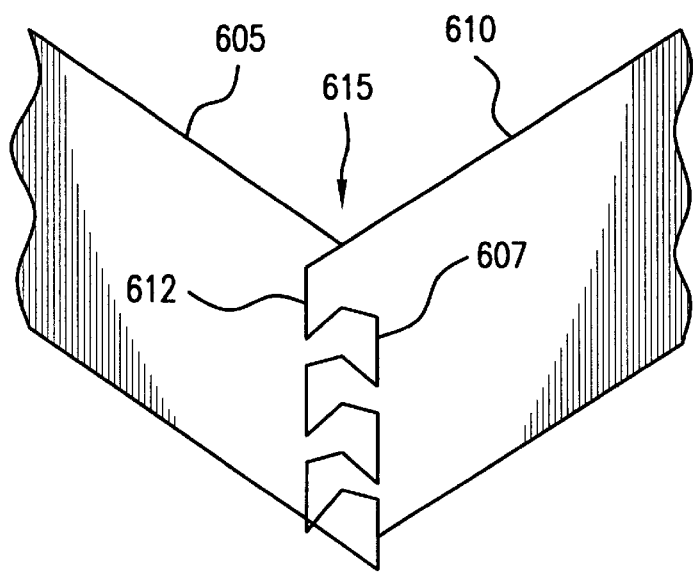
Figure 6B:
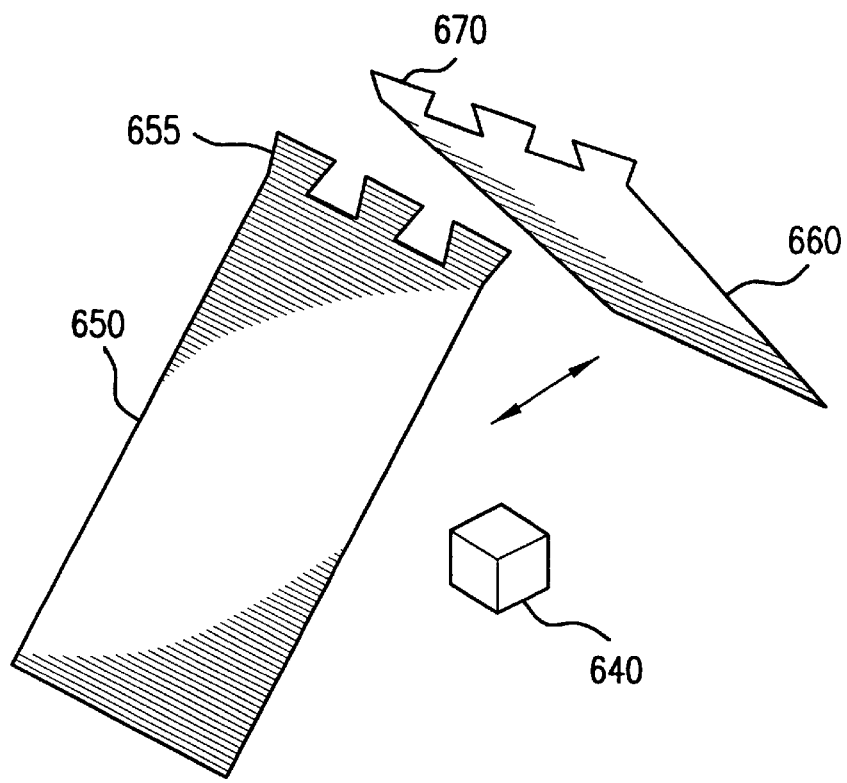
FIG. 6B illustrates a method of edge attachment, according to an alternative embodiment of the invention.
Figure 6B:
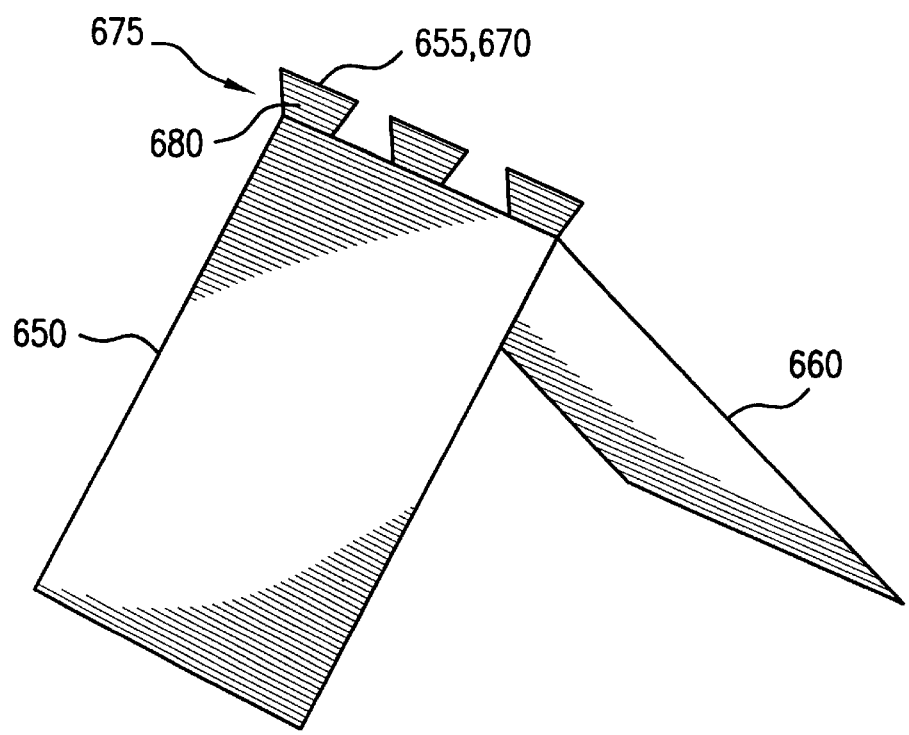

When two fabricated shapes are to be joined at their respective edges, the edge attachment step, step 140 of flowchart 100, can be performed in a number of ways. Two such methods are illustrated in FIG. 6A and FIG. 6B respectively. FIG. 6A shows two fabricated shapes, 605 and 610, whose edges are to be joined. In this embodiment, model attachment tabs have been added to the developable surfaces during the boundary abstraction process of step 125. As a result, fabricated shape 605 includes physical attachment tabs 607. Likewise physical attachment tabs 612 have been added to fabricated shape 610. Note that physical attachment tabs 607 and physical attachment tabs 612 are arranged so that when the two edges are joined, the physical attachment tabs interleave. Note also that physical attachment tabs 607 and physical attachment tabs 612 are flared at their respective ends, so that each physical attachment tab is wider at the end than at the root. This serves to secure intersection 615 when the physical attachment tabs are interleaved. Note that the attachment process of FIG. 6A works most readily when the material used for the fabricated shapes is sufficiently flexible to allow manipulation of the physical attachment tabs.

In an alternative embodiment, edge attachment step 140 can be accomplished as illustrated in FIG. 6B. A box 640 is shown to give the viewer perspective. In this example, a fabricated shape 650 is shown having physical attachment tabs 655. A fabricated shape 660 is shown having physical attachment tabs 670. As in the previous case, model attachment tabs are added to the planar models in step 125. As a result, fabricated shapes 650 and 660 include physical attachment tabs 655 and physical attachment tabs 670, corresponding to the model attachment tabs. Note that physical attachment tabs 655 and physical attachment tabs 670 correspond to one another when fabricated shapes 650 and 660 are joined at an intersection 675. Because of the coincidence of the physical attachment tabs, each of the physical attachment tabs 655 adjoin one of the physical attachment tabs 670. Each resulting pair of physical attachment tabs can then be secured by one or more binding components 680. Examples of a binding components 680 include wire loops and elastic bands. Binding components 680 can also include nuts and bolts and the like. Binding components 680 secure the physical attachment tabs pairwise, where each pair includes a physical attachment tab from each of fabricated shapes 650 and 660. This results in the attachment of the edges.

Note that in FIGS. 6A and 6B, the edges to be joined are essentially straight, apart from the physical attachment tabs. The use of physical attachment tabs, however, has the advantage of being able to secure two adjoining edges even if the edges are not straight. The edges, for example, may be curved. In such a case, the attachment mechanisms illustrated in FIG. 6A and 6B will nonetheless serve to attach the two edges.

III. System

Figure 7:
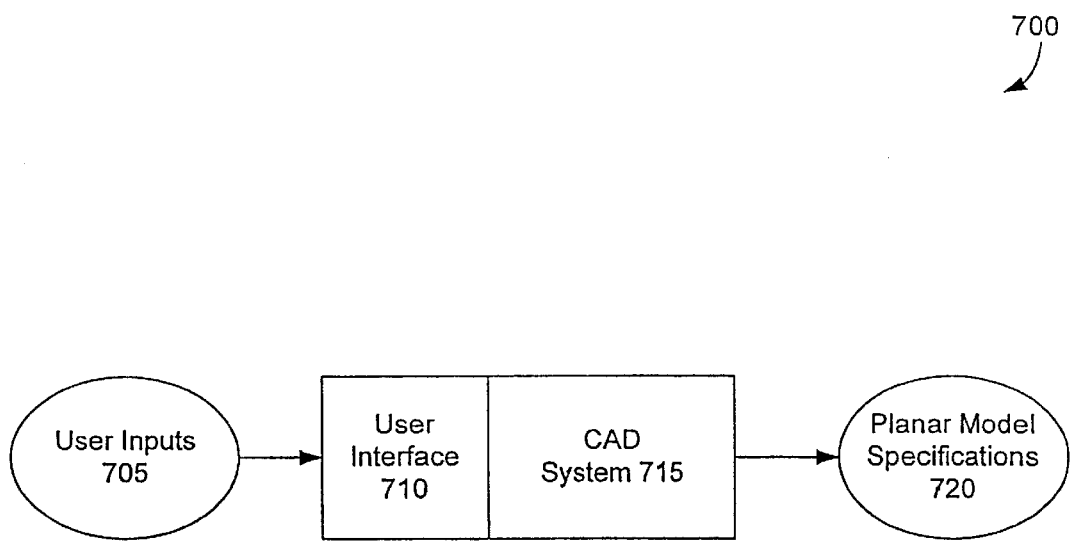
FIGS. 7 and 8 illustrates a computing environment in which the method of the invention can be executed.

The method of the present invention can be implemented using a commercially available CAD system. Using such a system, a user can produce specifications for a planar model based on user inputs. An illustration of such a CAD system, as used in the invention, is presented in FIG. 7. User inputs 705 include the definition and arrangement of the developable surfaces used to model the object to be fabricated. As described in section II above, the surfaces defined and arranged by user inputs 705 are constrained to developable surfaces only. User inputs 705 are entered, through a user interface 710, to a CAD system 715. CAD system 715 calculates the intersections of the developable surfaces and abstracts the boundaries of the developable surfaces. This yields specifications 720 of planar models that correspond to the developable surfaces.

IV. Environment

Figure 8:
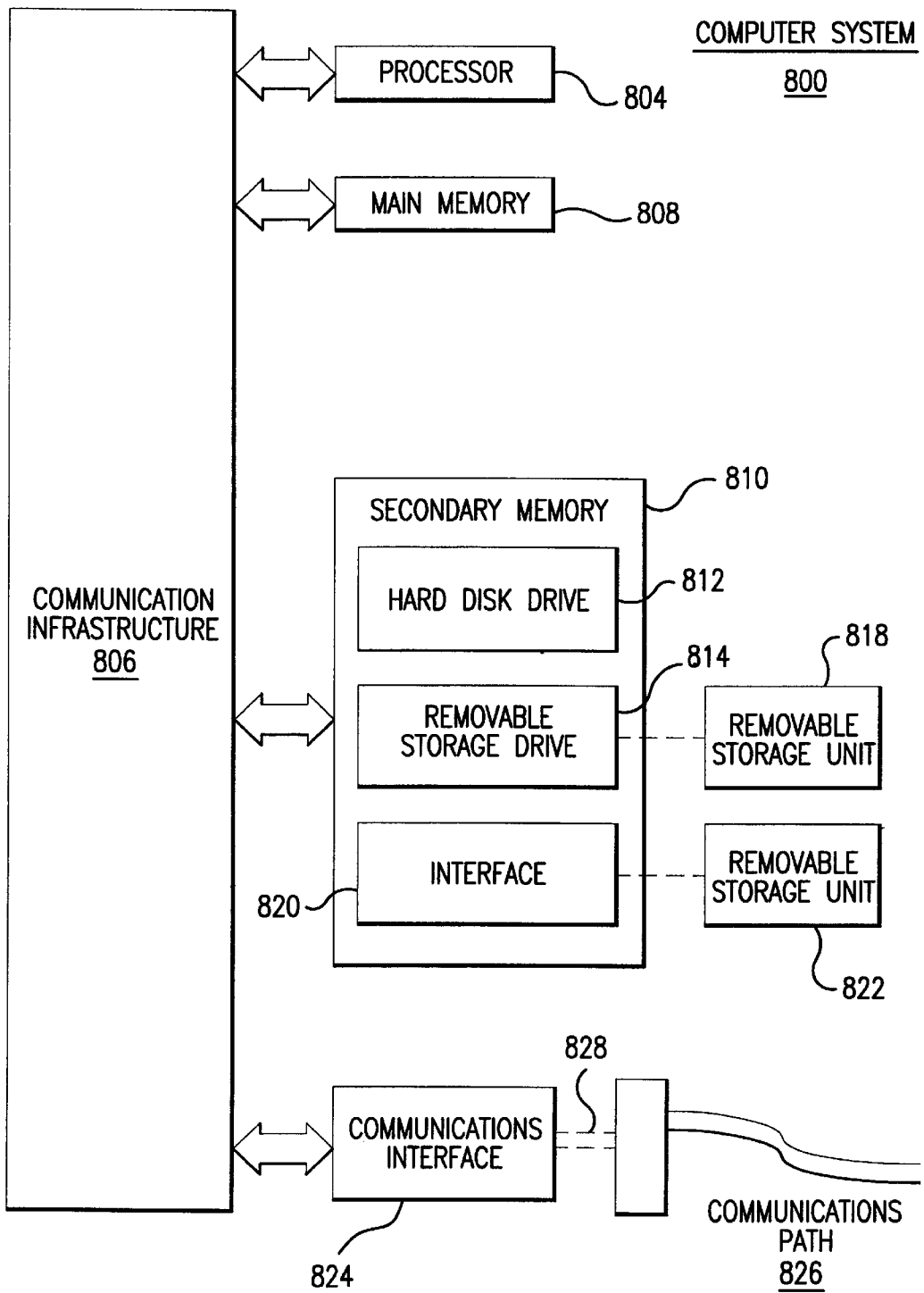

The present invention may be implemented using hardware, software or a combination thereof and may be implemented in a computer system or other processing system. An example of such a computer system 800 is shown in FIG. 8. The computer system 800 includes one or more processors, such as processor 804. The processor 804 is connected to a communication infrastructure 806, such as a bus or network). Various software implementations are described in terms of this exemplary computer system. After reading this description, it will become apparent to a person skilled in the relevant art how to implement the invention using other computer systems and/or computer architectures.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, or other storage medium which is read by and written to by removable storage drive 814. As will be appreciated, the removable storage unit 818 includes a computer usable storage medium having stored therein computer software and/or data.

In alternative implementations, secondary memory 810 may include other means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between =computer system 800 and external devices. Examples of communications interface 824 may include a modem, a network interface (such as an Ethernet card), a communications port, a PCMCIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path (i.e., channel) 826. This channel 826 carries signals 828 and may be implemented using wire or cable, fiber optics, a phone line, a cellular phone link, an RF link and other communications channels. In an embodiment of the invention, signals 828 comprise design information, i.e., commands and data, are sent by the designer to processor 804 through input/output (I/O) devices, such as a keyboard, mouse, or stylus. Information representing planar models can also be sent in the form of signals 828 from processor 804 to an output device connected to communications path 826. Alternatively, information representing planar models can also be saved by processor 804 in secondary memory 810, for subsequent use in fabrication.

In this document, the terms "computer program medium" and "computer usable medium" are used to generally refer to media such as removable storage units 818 and 822, a hard disk installed in hard disk drive 812, and signals 828. These computer program products are means for providing software to computer system 800.

Computer programs (also called computer control logic) are stored in main memory 808 and/or secondary memory 810. Computer programs may also be received via communications interface 824. Such computer programs, when executed, enable the computer system 800 to implement the present invention as discussed herein. In particular, the computer programs, when executed, enable the processor 804 to implement the present invention. Accordingly, such computer programs represent controllers of the computer system 800. Where the invention is implemented using software, the software may be stored in a computer program product and loaded into computer system 800 using removable storage drive 814, hard drive 812 or communications interface 824. In an embodiment of the present invention, steps 110 through 125 of process 100 are implemented in software that can therefore be made available to processor 804 through any of these means.

IV. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of creating an object that includes a surface, the method comprising the steps of:
   (a) modeling the surface of the object using a developable surface;
   (b) determining a boundary of the developable surface; and
   (c) fabricating the object, using said boundary of said developable surface as a fabrication constraint, wherein said fabricating step comprises the steps of:
      (i) abstracting the boundary of the developable surface to produce a two dimensional planar model of the developable surface;
      (ii) fabricating a shape proportional to the planar model to produce a fabricated shape;
      (iii) forming the fabricated shape in accordance with the developable surface; and
      (iv) attaching an edge of the fabricated shape to at least one of:
         another component of the object; and
         the fabricated shape.

2. The method of claim 1, wherein step (a) comprises forming the developable surface.

3. The method of claim 1, wherein step (a) comprises arranging the developable surface relative to another developable surface used in modeling the surface of the object.

4. The method of claim 1, wherein step (b) comprises the step of calculating an intersection of the developable surface with another developable surface used in modeling the surface of the object.

5. The method of claim 4, wherein said calculating step comprises the steps of:
   (i) modeling the developable surface as a mesh of polygons;
   (ii) modeling the other developable surface as a respective mesh of polygons;
   (iii) calculating intersections at which polygons of the developable surface intersect polygons of the other developable surface; and
   (iv) constructing traces of the intersections, to identify an intersection of the developable surface with the other developable surface.

6. The method of claim 1, wherein step (b) comprises calculating an intersection of the developable surface with itself.

7. The method of claim 6, wherein said calculating step comprises the steps of:
   (i) modeling the developable surface as a mesh of polygons;
   (ii) calculating intersections at which polygons of the developable surface intersect other polygons of the developable surface; and
   (iii) constructing traces of the intersections, to identify an intersection of the developable surface with itself.

8. The method of claim 1, further comprising the step of:
   (d) trimming any excess surface area from the developable surface;
   wherein said step (d) is performed after step (b) and before step (c).

9. The method of claim 1, wherein step (i) comprises the step of producing a two-dimensional planar model for the developable surface, where the planar model comprises at least one model attachment tab.

10. The method of claim 9, wherein step (ii) comprises the step of fabricating a shape proportional to the planar model, wherein the fabricated shape comprises at least one physical attachment tab corresponding to the at least one model attachment tab of the associated planar model.

11. The method of claim 10, wherein step (iv) comprises the step of attaching the edges of the fabricated shape using the at least one physical attachment tab.

12. The method of claim 11, wherein said attaching step comprises the step of interleaving the at least one physical attachment tab along the edges of the fabricated shape with physical attachment tabs of another fabricated shape.

13. The method of claim 11, wherein said attaching step comprises the step of binding the at least one physical attachment tab of the fabricated shape to at least one corresponding physical attachment tab of another fabricated shape, using binding components along the edges of the fabricated shapes.

14. A computer program product comprising a computer usable medium having computer readable program code that executes on a computer that models an object comprising a surface, said computer readable program code comprising:

(a) first computer readable program code logic for causing the computer to model the surface of the object using a developable surface;

(b) second computer readable program code logic for causing the computer to calculate the boundary of the developable surface;

wherein said second computer readable program code logic further causes the computer to calculate an intersection of said developable surface with itself; and (c) third computer readable program code logic for causing the computer to abstract the boundary of the developable surface to produce a planar model of the developable surface.

15. A system for modeling an object that includes a surface, the system comprising:

a user interface for receiving inputs from a user where any surfaces defined and arranged by said inputs are constrained to developable surfaces only; and a computer-aided design (CAD) system for receiving said inputs from said user interface, calculating boundaries of said developable surfaces, abstracting the boundaries of said developable surfaces, and producing specifications of planar models corresponding to said developable surfaces, wherein said boundary calculation comprises calculating an intersection of said developable surface with itself.

* * * * *